United States Patent
Schoeniger et al.

(10) Patent No.: US 6,843,272 B2
(45) Date of Patent: Jan. 18, 2005

(54) CONDUCTANCE VALVE AND PRESSURE-TO-CONDUCTANCE TRANSDUCER METHOD AND APPARATUS

(75) Inventors: Joseph S. Schoeniger, Oakland, CA (US); Eric B. Cummings, Livermore, CA (US); James S. Brennan, Rodeo, CA (US)

(73) Assignee: Sandia National Laboratories, Livermore, CA (US)

( * ) Notice: Subject to any disclaimer, the term of this patent is extended or adjusted under 35 U.S.C. 154(b) by 223 days.

(21) Appl. No.: 10/304,346

(22) Filed: Nov. 25, 2002

(65) Prior Publication Data

US 2004/0099321 A1 May 27, 2004

(51) Int. Cl.$^7$ .............................. F15B 1/04; F15B 21/00
(52) U.S. Cl. ...................... 137/827; 137/806; 137/807; 137/828; 204/451; 204/600; 204/601
(58) Field of Search ................................ 137/806, 807, 137/827, 828; 204/461, 600, 601

(56) References Cited

U.S. PATENT DOCUMENTS

| | | | | |
|---|---|---|---|---|
| 5,147,296 A | * | 9/1992 | Theeuwes et al. | 604/20 |
| 5,699,462 A | * | 12/1997 | Fouquet et al. | 385/18 |
| 6,062,681 A | * | 5/2000 | Field et al. | 347/65 |
| 6,274,089 B1 | * | 8/2001 | Chow et al. | 422/101 |
| 6,277,257 B1 | * | 8/2001 | Paul et al. | 204/450 |
| 6,547,942 B1 | * | 4/2003 | Parce et al. | 204/453 |
| 6,725,882 B1 | * | 4/2004 | Shia et al. | 137/827 |
| 2002/0150683 A1 | * | 10/2002 | Troian et al. | 427/256 |

* cited by examiner

Primary Examiner—A. Michael Chambers
(74) Attorney, Agent, or Firm—Timothy P. Evans

(57) ABSTRACT

A device for interrupting or throttling undesired ionic transport through a fluid network is disclosed. The device acts as a fluid valve by reversibly generating a fixed "bubble" in the conducting solvent solution carried by the network. The device comprises a porous hydrophobic structure filling a portion of a connecting channel within the network and optionally incorporates flow restrictor elements at either end of the porous structure that function as pressure isolation barriers, and a fluid reservoir connected to the region of the channel containing the porous structure. Also included is a pressure pump connected to the fluid reservoir. The device operates by causing the pump to vary the hydraulic pressure to a quantity of solvent solution held within the reservoir and porous structure. At high pressures, most or all of the pores of the structure are filled with conducting liquid so the ionic conductance is high. At lower pressures, only a fraction of the pores are filled with liquid, so ionic conductivity is lower. Below a threshold pressure, the porous structure contains only vapor, so there is no liquid conduction path. The device therefore effectively throttles ionic transport through the porous structure and acts as a "conductance valve" or "pressure-to-conductance" transducer within the network.

36 Claims, 7 Drawing Sheets

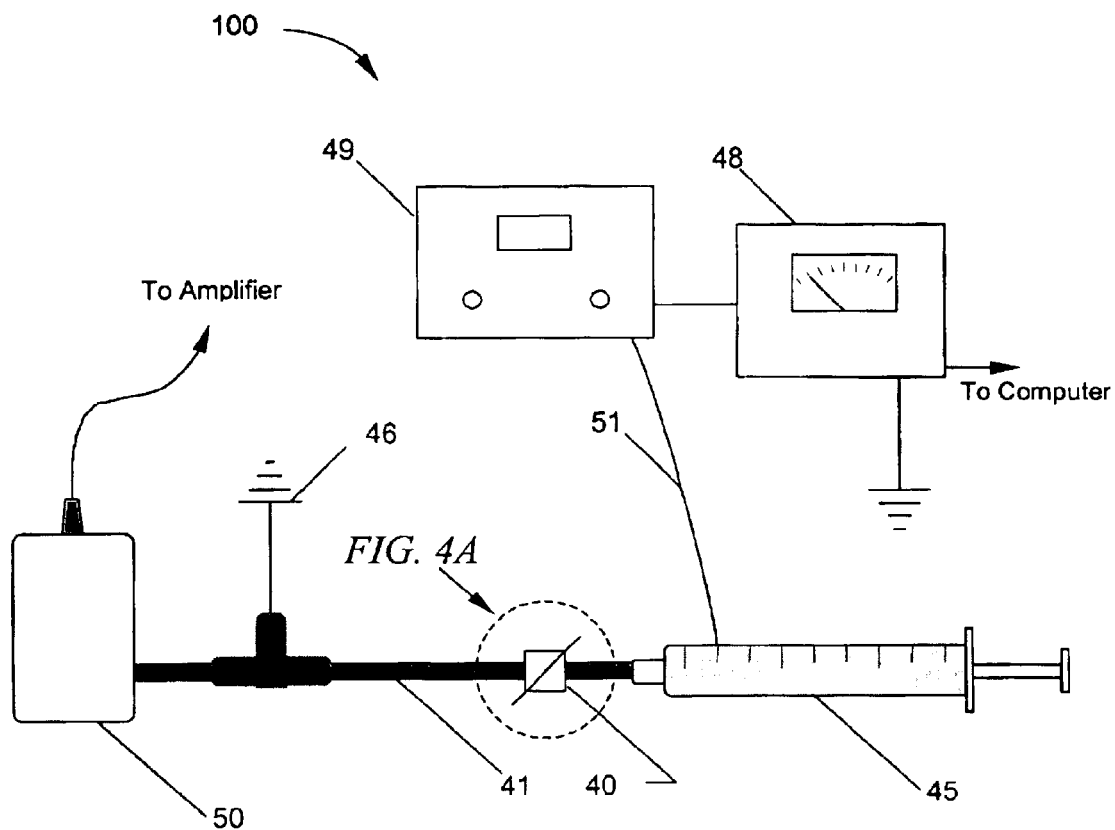
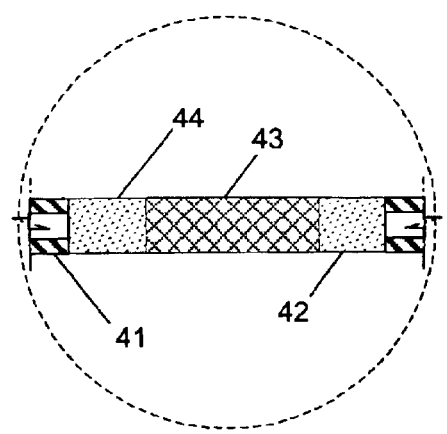
FIG. 4A
FIG. 4

CONDUCTANCE VALVE AND PRESSURE-TO-CONDUCTANCE TRANSDUCER METHOD AND APPARATUS

STATEMENT OF GOVERNMENT INTEREST

This invention was made with Government support under government contract no. DE-AC04-94AL85000 awarded by the U.S. Department of Energy to Sandia Corporation. The Government has certain rights in the invention, Including a paid-up license and the right, in limited circumstances, to require the owner of any patent issuing in this invention to license others on reasonable terms.

BACKGROUND OF THE INVENTION

1. Field of the Invention

The present invention relates to a method for controlling undesirable flow of charged species across, or between, regions of a fluid network such as a separation network. Such systems typically comprise multiple separation channels connected by a common manifold and in those systems where separation is driven by an electrical gradient (electrokinetic pumping), a means for uncoupling species transport between channels is desirable.

Integrated microfluidic networks used for analytical microseparations generally rely on electrokinetic phenomena for control of material transport through the channels. A recurring network topology consists of a distribution manifold connected to many parallel channels. This arrangement, shown schematically in FIGS. 1A and 1B for the case of two channels, enables a common buffer solution or sample to be distributed to all channels, but then allows individual channels to perform different functions.

FIGS. 1A and 1B shows a top view of two states of a microfluidic network 1 of channels fabricated using micromachining techniques. The channel network shown contains two separation channels 2 and 3, manifold 4 and manifold branches $5_L$ and $5_R$ several supply or waste reservoirs 6–12 disposed at terminal ends of channels 2 and 3 and manifold branches $5_L$ and $5_R$. Programmed electrical voltages may be imposed on each reservoir (or the reservoirs may be floated) using an electrode or electrodes (not shown) in order to induce ionic flow. FIG. 1A shows the state of the network in which a solute sample (e.g., some set of dissolved species) is distributed from negatively charged sample solution reservoir 6 through manifold 4 and "injected" across each of vertical separation channels 2 and 3, and then flows into positively-charged waste reservoirs 9 and 10 while, in this example, the potential of the remaining four reservoirs is floated. The sample (not shown) is carried along by a combination of electrophoresis and electro-osmosis caused by the imposed voltage gradients. While the sample is not shown, the progression of the sample, assumed to comprise species having negative electrokinetic (EK) mobility, is indicated by block arrows 13 and 14 along the left and right arms of manifold 4. Species having a positive EK mobility remain in reservoir 6.

In FIG. 1B, the electrical potentials of sample reservoirs 6 and waste reservoirs 9 and 10 are allowed to float, and voltage gradients are applied along each of channels 2 and 3. (Here, different polarities of voltage gradients are shown to emphasize the fact that the separations in channels 2 and 3 may be different from one another.) Block arrows 15 and 16 now show the desired direction of transport of the sample species "of interest" down the length of the separation channels 2 and 3 respectively. For example, if there were no electro-osmotic flow in the separation channels, positively charged species that have a negative electrokinetic mobility would separate in channel 3, and negatively charged species in channel 2, while oppositely charged species would move to respective waste reservoirs 7 and 8 at the top of channels 2 and 3, and neutral species would remain stationary.

However, it is apparent is that the arrangement illustrated in FIG. 1B can produce unwanted electrical "cross-talk" between the two separation channels, creating a current indicated by line arrows 17. Therefore, in addition to the desired transport of species through a particular channel, this "cross-talk" can transport ionic species between the coupled channels through the manifold.

2. Prior Art

A solution to the problem of this spurious ionic flow is the subject of the present invention. The simplest conceptual scheme would be a mechanical valve, where a solid element is slid across, or is rotated into and out of, the channel, thereby greatly reducing the cross sectional area of the separation channel. Although miniature valves are common, all examples known to the Applicants have dead volumes that are one or more orders of magnitude too large for use in the proposed microfluidic network. Numerous problems with tolerances, stiction, and limitations of micromachining materials and methods make the use of a mechanical valve extremely challenging for microfabricated microfluidic networks.

An alternate approach to providing a reversible barrier would be to generate a gas bubble along the flow path (channel) since, clearly, a channel whose cross section contains such a bubble has a lower ionic conductance than an unobstructed channel containing only the conducting solvent medium. However, given the dangers of gas bubbles becoming entrained in the solution and/or migrating uncontrollably, localization and reversibly of bubble formation is absolutely essential. That is, the need for an independently controllable means for both generating and eliminating localized gas bubbles is critical to the proper operation of this invention. In the specific case of an electrokinetic switch ("EK switch") relying on a gas bubble, if the bubble escapes from confinement in the switch region and blocks conductance through a channel, there may be no means to reestablish ionic conduction and fluid transport through that channel.

Numerous references to the use of in situ generated bubbles exist in the prior art. In particular, various U.S. patents contained in class 347, and particularly U.S. Pat. Ser. No. 6,062,681 to Field, et al., describe the use of bubbles as elements to control ink flow in print heads of ink-jet printer cartridges. Furthermore, Field, et al, refer to a publication by Thomas K. Jun and Chang-Jin Kim entitled "Microscale Pumping with Traversing Bubbles In Microchannels" (SOLID-STATE SENSOR AND ACTUATOR WORKSHOP, HILTON HEAD, SOUTH CAROLINA, 144–147, Jun., 2–6, 1996) that suggest that a stationary vapor bubble formed by boiling a liquid flowing through a channel could serve as an obstruction against flow in the channel and therefore function as a valve. However, such a valve is impractical in a typical liquid that includes dissolved gas because flow of liquid cannot easily be restored.

Field, et al. also refer to the dissertation of Liwei Lin, entitled "Selective Encapsulations of [Micro Electro-Mechanical Systems]: Micro-Channels, Needles, Resonators and Electro-mechanical Filters", University of California at Berkeley, 1993, also describes forming and moving bubbles within microchannels. The bubbles were formed by using micro-heaters to heat the liquid to a temperature close to its critical temperature. This reference also describes the effect of the shape of the flow channel on the preferred direction of movement of the bubble Finally, U.S. Pat. No. 5,699,462 of Fouquet et al., describes using gas or vapor bubbles as switching elements for controlling the passage of optical communication signals through waveguides. This patent also describes forming the bubbles by using micro-heaters to heat the liquid. Bubble formation is enhanced by use of a gas dissolved in the fluid. The bubble is moved by creating a second bubble to force the first from its location.

The use of a bubble as a control element in a fluid channel, therefore, has been described. However, to limit the position of the bubble to a specific location within a fluid network, has not been described. That is, the prior art provides no teaching for how a gas bubble could be reversibly created and extinguished nor how its position could be maintained to provide process localization. Furthermore, the means taught by these references for creating and elimination bubbles is limited to the use of a heater element.

Other methods for eliminating gas bubbles such as by venting, dissolving, or reacting or condensing the gas, or by applying high pressure to reduce the size of the bubble are possible. Venting bubbles controllably, in the sorts of structures needed for microfluidic networks, however, requires the ability to pressure-flush the bubble into a micromachined purgeable bubble trap. Although such an approach may be possible, the complexities of such a micro-machined design are considerable. Rapid injection or electrolytic generation of a highly soluble gas could be used to create a bubble that has a finite lifetime. However, this creates a danger of outgassing at some other point in the network, and highly soluble gasses (e.g., ammonia) may greatly disrupt the pH or other properties of the solution. Reacting (chemically scrubbing) the gas bubble appears to raise many of the same complexities.

SUMMARY OF THE INVENTION

To solve the problem of a suitable valve we have created a microfluidic element that can be interposed in the manifold to disrupt or throttle the electrokinetic transport through the manifold reversibly. Furthermore, this element also has a range of uses not confined to the sorts of topologies displayed here, but could be used to reversibly couple and uncouple channels electrically in a large variety of applications and configurations. The disclosed element, hereinafter referred to as an EK valve, is constructed by creating a region in a channel in which the connectivity of the fluid path can be reversibly disrupted partially or completely. Limiting or breaking the contiguity of the fluid filling the channels throttles or blocks both current flow and electrokinetic transport through the channel (assuming the interior walls of the microfluidic network are non-conducting; it they are conductive, the EK valve may only disrupt electrokinetic transport).

For the EK valve to be a controllable element in a network that employs electrokinetic fluid transport, localization of the disruption in ionic conductivity is crucial. In the specific case of a EK valve relying on a gas bubble, there may be no means to reestablish ionic conduction and fluid transport through that channel if the bubble escapes from confinement in the valve region and blocks conductance through a channel. One way in which bubbles may be definitively localized is to create conditions such that the bubble can only exist within a certain localized region, and will spontaneously change back to the liquid phase, dissolve, or react to form a liquid or dissolved material immediately upon leaving that region. For example, one could create a localized heated area, and thereby generate a steam bubble. Outside the localized area, the bubble would recondense. However, the need for providing high temperatures severely limits the range of applications for which this approach is suitable.

It is, therefore, an object of this invention to provide a valve means for controlling the flow of ionic species in a microfluidic network comprising a localized bubble wherein the bubble can be reversibly nucleated and enlarged, and eliminated.

It is still another object of this invention to provide a means for localizing a bubble within a microfluidic network.

It is yet another object of this invention to provide an electrokinetic pump for hydrostatically acting on a bubble.

It is a therefore a further object of this invention to providing a hydrophobic matrix comprising a packed bead of TEFLON® microspheres within whose pores a reversibly solvent bubble valve is generated and controlled by hydrostatic pressure.

These and other objects will now become apparent to those having ordinary skill in these arts as the description of the invention and its appended claims are recited in detail below.

BRIEF DESCRIPTION OF THE DRAWINGS

FIG. 4 illustrates the experiment test stand used to confirm the operation of the invention.

FIG. 7A shows a simple pressure meter; FIG. 7B shows a simple pressure-drop flow meter; and FIG. 7C shows an enhanced-sensitivity bi-directional pressure-drop flow meter.

DETAILED DESCRIPTION OF THE INVENTION

Figure 1A:
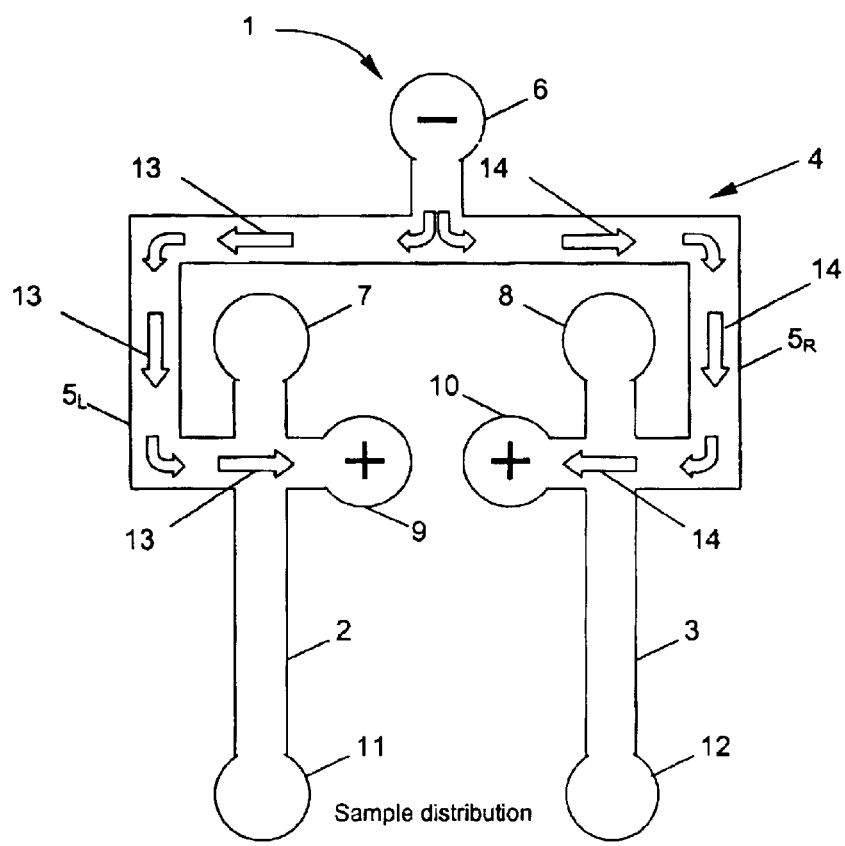
FIG. 1A illustrates a typical electrokinetic flow of a sample from a common reservoir into a network of separation columns.

An EK valve is described that is based on controllably vaporizing and recondensing a solvent material contained in a microchannel in order to create reversible "bubbles" by competing forced pressurization with spontaneous de-wetting or wetting by surface-tension effects. The forced pressurization is a controlled raising or lowering of the local hydrostatic pressure by the use of an auxiliary pump, such as an electrokinetic pump, described in commonly-owned U.S. Pat. No. 6,277,257 herein incorporated by reference, acting on a carrier fluid. The de-wetting or wetting behavior of the device is adjusted by using bulk materials or surface coatings having specific interfacial properties to create regions in the channel in which a vapor can be easily created and recondensed by applying or releasing modest amounts of pressure. Alternatively, the vaporization and recondensation of a solvent could be caused by reversibly changing the interfacial properties of the material. In a porous hydrophobic medium having pores below a critical size, capillary forces may cause water (or other non-wetting solvents, such as for example acetonitrile, tetrahydrofuran, cyclohexane, dimethylsulfoxide, dimethylformamide, and propylene carbonate) in the pores to vaporize spontaneously at room temperature and pressure. This phenomenon of spontaneous de-wetting is well-known to practitioners of reverse-phase chromatography as "column drying;" and it occurs rapidly in chromatography column "beds" packed with hydrophobic beads if a minimum applied hydrostatic pressure within the column is not continuously maintained on the solvent medium in the bed. Failure to maintain this minimum pressure gives rise to an un-wetted, or "dry," region along the length of column bed.

In a local region of porous hydrophobic material, therefore, conditions may be created wherein bubbles of solvent vapor are stable, but recondense in adjacent regions. In the case of column drying, bubbles are generally removed by pumping liquid through the column under high pressure to flush out bubbles occurring in the dry section. The pressure required to force liquid back into the pores is related to the porosity and contact angle. As described below, so long as the solvent vapor has not been replaced by air or some other gas, the vapor can be recondensed by applying pressure, thereby reestablishing significant levels of ionic conductivity in the fluid material.

THEORY

To illustrate the present invention, an idealized network is described in which changes in ionic conductance in a material may be reversibly generated. Consider a sealed chamber filled with a porous, non-conductive, hydrophobic material that is connected to a constant-pressure reservoir of an aqueous solvent capable of conducting ionic currents (e.g., pure water, water/organic mixtures, etc.). Assume that the thermodynamic state of the fluid in the reservoir is initially set so that the combination of the temperature and pressure are just sufficient to ensure all the pores of the hydrophobic material are filled with the conducting solution. If an electric potential is applied between distal electrodes in the container, the porous material will display a degree of ionic conductance that depends on solution properties such as the bulk conductivity of the aqueous solvent and the electrical formation factor of the material. This is the peak conductance of the material, since current can flow through all pores. If the pressure in the reservoir is lowered or the temperature is raised, or some combination of these changes, the liquid solvent will spontaneously boil or de-wet all pores having characteristic dimensions smaller than a threshold value. The ionic conductance of the medium is now reduced, since the electrical formation factor now excludes all pores below this threshold size. Further reducing the pressure and/or increasing the temperature increases the de-wetting threshold size, de-wetting a larger fraction of the pores, and further lowers the material conductance. At a sufficiently low reservoir pressure and/or high reservoir temperature, the solution will boil until all the solvent in the medium is in the vapor phase. As such, the ionic conductivity of this "dry" porous material, is reduced to negligible levels compared to the situation in which the porous material is filled with liquid. The hydrophobicity and pore size of the system can be tuned to set this low-pressure/high-temperature limit, which can be below, at, or above atmospheric pressure and temperature.

Finally, it should be understood that the device of the foregoing description is sensitive to its thermodynamic state. That is, in general operation the device is sensitive to both pressure and temperature. At constant temperature, it acts as a pressure transducer, and at constant pressure, it acts as a temperature transducer. As such, everywhere we explicitly recite "pressure", we also implicitly mean temperature; everywhere we recite pressure rising, we also imply the same effect for manifested by temperature falling.

Consider now what happens if the pressure in the reservoir is raised. The liquid vapor in the un-wetted pores will progressively recondense and liquid will flow from the reservoir into the material until, at equilibrium, all pores larger than a threshold size are filled and a finite material conductance is restored. At a sufficiently high pressure, the entire material is filled with solution and the conductance return to its peak value. Subsequent cycles of depressurization and repressurization, therefore, lead to large, cyclical changes in the conductivity of the porous matrix.

Due to surface tension or capillarity, curved surfaces, such as those in small pores, can be used to raise or lower the pressure at which a solvent boils in hydrophobic or hydrophilic porous materials, respectively. Moreover, this phenomenon is not restricted to porous matrices but occurs in any channel that induces a sufficiently large curvature in the liquid in at least one dimension. This condition includes cylindrical capillaries, as well as the interface of curved structures within a channel or the interface between two parallel planes separated by a small gap, etc. By the use of microfabricated structures such as obstacles (localized regions of a channel where the depth changes), posts (localized regions of a channel where a structure substantially spans the depth of the channel such as are described in commonly-owned U.S. patent application Ser. Nos. 09/886,165 and 10/176,322, herein incorporated by reference), or shelves (regions where the depth of a channel changes), the distribution of these interfaces and, therefore, the pressure-bias points and conductance vs. pressure curves of devices can be readily engineered for specific applications. With a somewhat lower degree of engineering control, conducting solutions and porous media having tailored pore-size distributions and hydrophobicity/hydrophilicity can be selected to meet specific requirements. The prototype valves of the present invention employ porous packings.

The Young-Laplace equation relates the pressure in liquid and gas phases at equilibrium, to the shape of the interface between the phases, $$p_l - p_v = \frac{2\gamma}{r}, \quad (1)$$

where $p_l$ and $p_v$ are the liquid-phase and vapor phase pressures, respectively, y is the surface tension between the two phases and r is the effective radius of curvature of the interface. When body forces are negligible, e.g., in small capillaries, a liquid-vapor interface inside a channel with cylindrical walls will assume a constant radius of curvature equal to, $$r = -\frac{d}{2\cos\theta}, \quad (2)$$

where d is the cylinder diameter and θ is the contact angle of the liquid on the surface of the cylinder interior wall.

Since the effect of the vapor or gas phase on the contact angle is usually insignificant the pressure difference between liquid and vapor phases in a circular channel or pore is, therefore, just, $$P_l - p_v = -\frac{4\gamma\cos\theta}{d}. \quad (3)$$

If the contact angle is greater than 90°, i.e., for a non-wetting system, the vapor phase pressure is lower than the liquid-phase pressure. At a critical diameter, the equilibrium Young-Laplace equation states the liquid-phase pressure will drop below zero. In fact, the vapor region grows in a non-equilibrium manner as the liquid-phase rapidly evaporates. The rate of this growth depends upon thermophysical properties of the liquid and the thermal properties of the channel.

While the dynamics of bubble nucleation and growth are too involved for this discussion, the phenomenon of spontaneous de-wetting can be understood by an analysis of the stability of the final de-wetted state. If the equilibrium pressure in the vapor phase given by the Young-Laplace equation is less than or equal to zero, the rate of release of surface energy by a retreating meniscus exceeds the pressure work done pushing against the full ambient pressure. In this case, even a complete vacuum behind the meniscus is incapable of halting its retreat. Consequently, fluids spontaneously de-wet in pores smaller than a critical size $$d = \frac{4\gamma\cos\theta}{p_a}, \quad (4)$$

where $p_a$ is the absolute pressure applied to the liquid.

For pure water on TEFLON®, at one atmosphere the critical pore size is about 1 μm in diameter. Increasing the applied pressure, however, reduces the critical pore size meaning that for a given pore geometry the entrained fluid will de-wet below a critical applied pressure and re-wet above a critical applied pressure. This phenomenon is the physical basis the EK switch design of the present invention. If the liquid phase is conductive, the presence of the vapor bubble breaks the liquid conduction path. Because of the absence of any residual film of liquid on the un-wetted surface and, in the absence of contaminants or surface-acting agents, the break in conduction is complete. Hence such devices can achieve a very high on/off current ratio.

Note, for spontaneous de-wetting, is not necessary for a bubble to be able to advance in a stable manner against the full applied pressure. Bubbles will form spontaneously when the pressure in the vapor phase drops below the vapor pressure of the liquid. For water at room temperature, this correction to the critical diameter is small. Because the dynamics of the bubble growth is uncertain, the temperature local to the meniscus, and hence the bubble vapor pressure is uncertain. When the system has returned to thermal equilibrium following de-wetting, the fluid will remain de-wetted until the (weaker) condition illustrated by Equation 3, with $P_v$ equal to the vapor pressure, is satisfied.

Best Mode of the Device

We have created a device that comprises small packed regions of a porous hydrophobic material that can be reversibly wetted and "dried" by applying and releasing small amounts of hydrostatic pressure to a column of solvent media in contact with the hydrophobic material thereby cycling the solvent medium into and out of the interstitial void spaces comprising the packed regions. We have shown also that current flow though such a device can be interrupted and restored in a controllable and repeatable manner by applying and releasing pressure.

The valve of the present invention is intended only to control the conductance of a channel within a network of channels but requires pressure isolation from the fluidic network to minimize the effect of pressures applied to the switch. Moreover, without this isolation means, it may not be possible to create a low enough pressure in the valve to allow de-wetting the packed porous region when the pathway into which the valve is inserted is under an applied hydrostatic pressure.

Figure 2A:
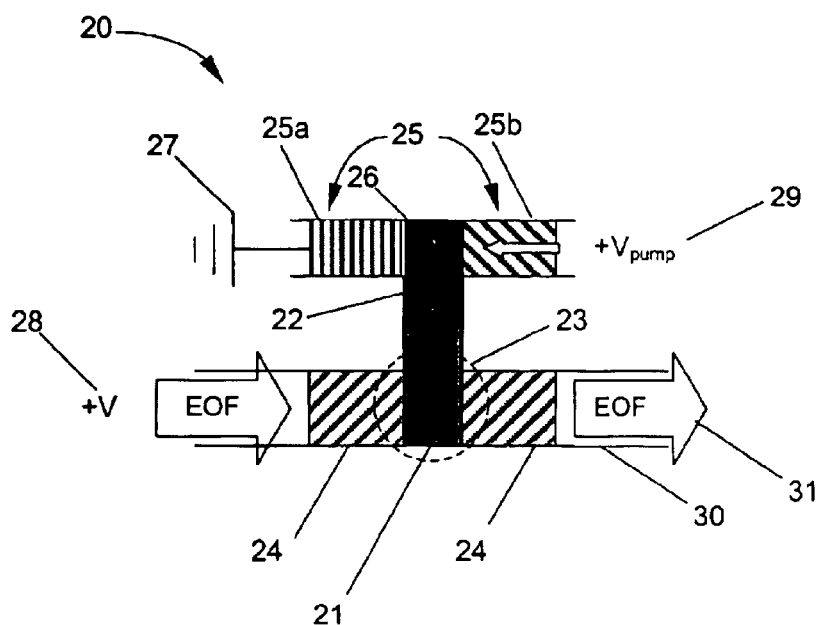
FIG. 2A illustrates the EK valve of the present invention in the "on" position allowing ion flow through the valve and the flow channel.
Figure 2B:
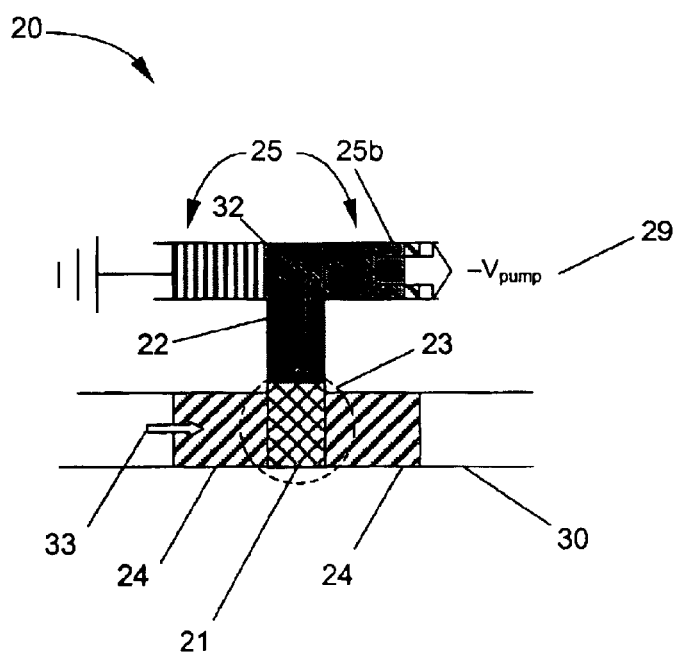
FIG. 2B illustrates the EK valve of the present invention in the "off" position blocking ion flow through the through the valve and the flow channel.

FIGS. 2A and 2B show a schematic representation of a (passively) isolated EK valve 20 inserted into a flow channel 30 that is part of a larger fluidic network of channels and manifolds. Valve 20 is itself comprised of an actuator 25, itself comprising salt bridge 25a and packed channel 25b, a short channel segment 22 that act as a fluid reservoir and as a means to connect actuator 25 with flow channel 30, and a quantity of hydrophobic material filling an intersection region 23 between channel segment 22 and flow channel 30 to provide hydrophobic matrix 21. In addition, flow restrictors 24 or salt bridges are placed on either side of hydrophobic matrix 21 contained within channel intersection 23 in order to isolate valve 20 from the remainder of the fluidic network. Also included are electrical leads/electrodes (not shown) for supplying power to the actuator 25 and a reservoir in order to accommodate the volume of solvent moving into and out of matrix 21.

In the case of the present invention the actuator mechanism is an electrokinetic pump similar to the device described in commonly owned U.S. Pat. No. 6,277,257. The purpose of the pump is to reversibly pressurize and de-pressurize portions of the solvent media contained within the valve, particularly within the zone comprising hydrophobic matrix 21. This function, however, need not be provided only by an EK pump. Alternately, a variety of means, including a conventional pump or pressure source, a thermally activated pressure pump such as, for example, a small heater element placed over the valve for causing vaporization and de-wetting in the hydrophobic valve material could be used to actuate valve 20. Hydrophobic matrix 21 is itself comprised of very finely divided spheres of polytetrafluoroethylene (PTFE), particularly 4 μm Ø PTFE powder (DuPont Zonyl MP 1200).

The present embodiment, valve 20 is shown isolated between two flow restrictors or two salt bridges 24. As noted earlier, it is necessary to isolate valve 20 from the network into which it is inserted such that when pressure changes generated by actuator 25 are largely isolated to the region of valve 20 so that their effects on the rest of the network are minimized. The resistance to hydraulic flow of flow restrictors 24 determines the degree to which the valve is (or can be) isolated from pressures in the network channel 30 and how well the channel is isolated from the pressures necessary to actuate the valve. Sufficiently high pressures in channel 30 can overwhelm the valve actuator pressures, causing re-wetting and defeating the efficacy of valve 20. In the present case, the flow restrictors comprise a quantity of silica beads (~5 μm Ø) packed into flow channel 30 on either side of hydrophobic matrix 21 and running for a length of several millimeters. Other materials such as for example glass, quartz, alumina, and rutile are also useful in this regard.

FIG. 2A, shows actuator 25 as an electrokinetic pump (EKP) opening valve 20 by pressurizing the solvent solution in pump portion 25b and channel segment 22 indicated by the descending block arrow 26. (Note that although the pump electrical circuit is shown running to ground 27, it could be floated or "balanced" to reduce cross-talk between the electrokinetic voltage potential 28 and the pump voltage 29.) As described above, pressurizing valve 20 creates a continuous fluid pathway, allowing ions to flow through along channel 30 and through flow restrictors 24 and actuator 25 and creating electro-osmotic transport (indicated by the large block arrows 31 labeled "EOF"). While this flow is shown as a large electro-osmotic flow, could just as well be an electrophorefic flow.

Figure 1B:
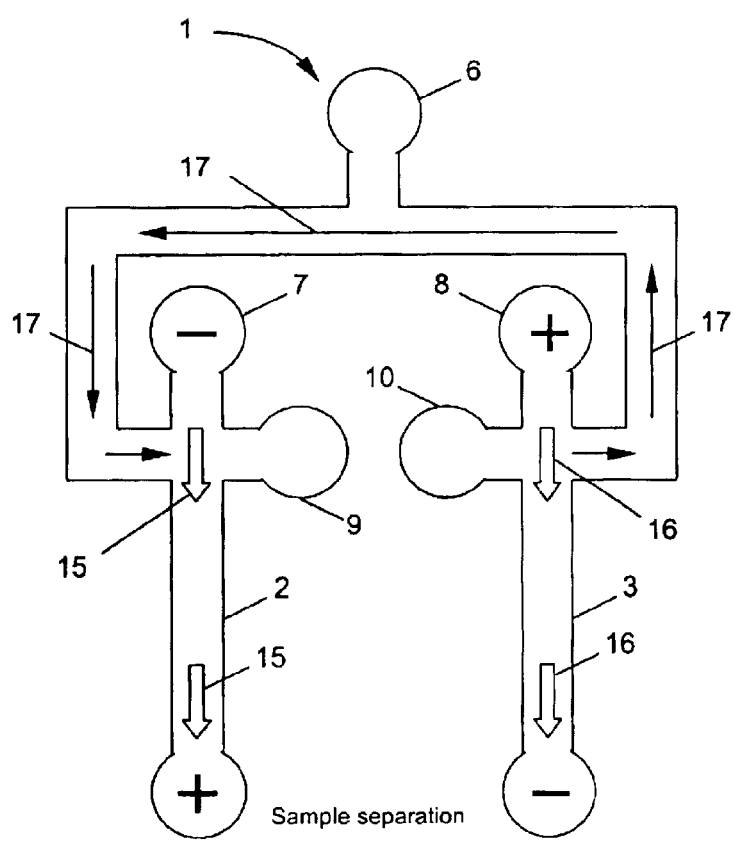
FIG. 1B illustrates the potential for unwanted electrokinetic flow of ionic species across the device manifold under the influence of an potential difference between columns.

FIG. 2B shows actuator 25 closing valve 20 by reversing the polarity of EK pump portion 25b, depressurizing the valve. This causes the solvent solution in hydrophobic matrix 21 to be withdrawn into channel segment 22 pump portion 25b (indicated by the ascending block arrow 32) which itself causes hydrophobic matrix 21 to "de-wetting" and thereby result in an obstruction, or "bubble," forming in channel 30 effectively blocking ionic transport through valve 20 and disrupting spurious electro-osmotic flow circuit pattern 17 illustrated in FIG. 1B. Such active actuation would be required if the pressure bias point for the valve's closed state were sub-ambient or for example to increase the dynamics of spontaneous de-wetting and depressurization.

As actuator 25 depressurizes intersection region 23 there may be a small flow, or pressure "leak," through the flow restrictors, as indicated by the smaller block arrows 33. However, if flow restrictors 24 and actuator 25 (in this case, an EK pump) are sized properly, the pump will still be able to produce enough of a pressure drop and back-flow of solvent media to prevent keep the hydrophobic matrix dry. Again, if the packing material is sufficiently hydrophobic, it may de-wet spontaneously at ambient pressures, so that the pump need only be turned off rather than to be actively reversed in order to open the EK valve.

Figure 3:
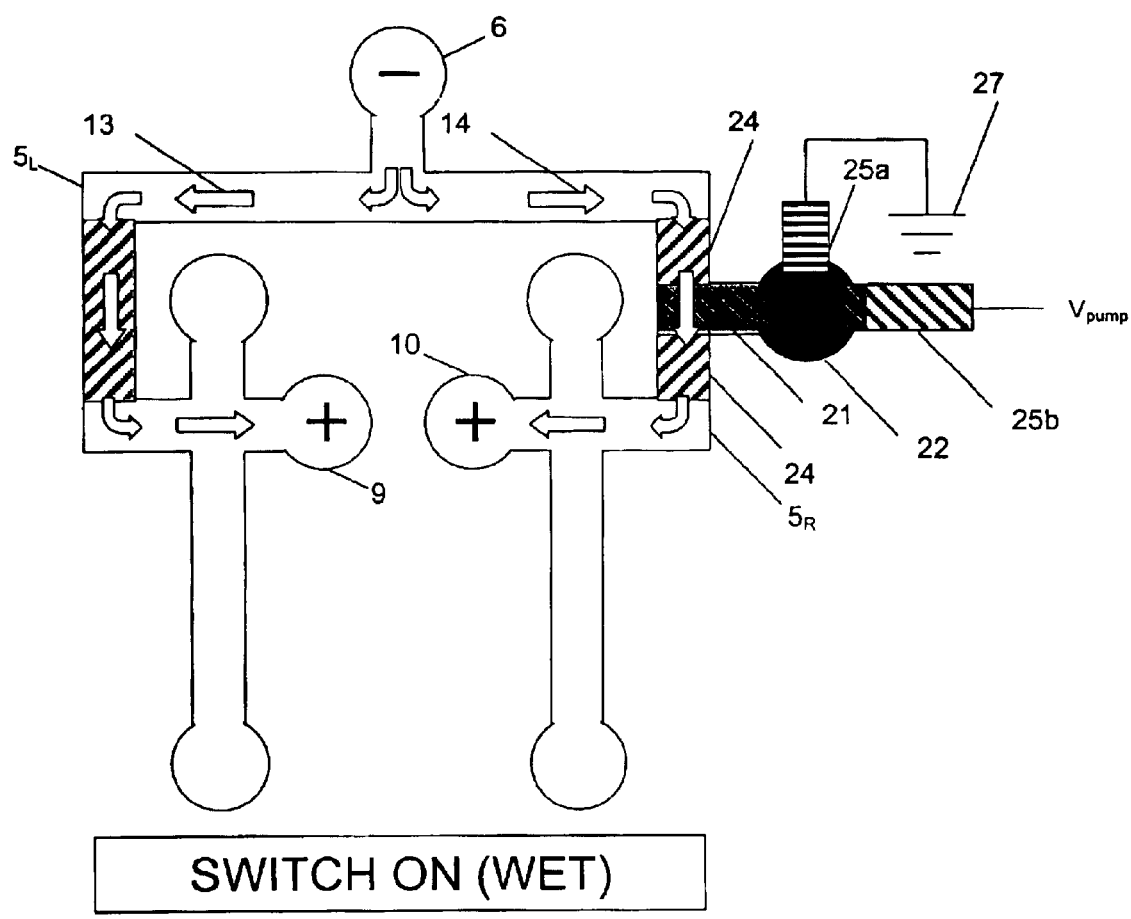
FIG. 3 illustrates an embodiment of the present invention showing a possible arrangement of the valve.

Finally, FIG. 3 illustrates how the device of the present invention might be deployed in a typical microfluidic network. In this embodiment EK valve 20 is introduced into one of the "arms" of network manifold 4 such that the valve traverses flow channel $5_R$. Electro-osmotic flow 13 and 14 from supply reservoir 6 is necessary to inject charged species into waste reservoirs 9 and 10 in preparation for separation analysis. (A second switch, a quantity of flow restrictor media 24 to occupy the opposite arm of the manifold $5_L$ in order to balance the resistance to injection flow on either side of the network manifold.)

EXAMPLE AND EXPERIMENTAL VALIDATION

Before describing specific experimental results, it is useful to describe some of the considerations concerning the use of such a device in an electrokinetic microfluidic network, and the materials from which such a device can be made. Although the device could be demonstrated with a large variety of different media or materials for providing a matrix of hydrophobic pores, the device of the present invention was constructed using packed beads of PTFE resin (DuPont TEFLON®) as the porous matrix. (Also useful are acetal resins, such as DuPont DELRIN®, and polytrifluorochloroethylene resins, such as 3M Kel-F®.) PTFE is chosen, however, because it has the following properties that are generally desirable for a device of this type, i.e., a conductivity switch, so that it may be interposed in a microfluidic network without otherwise disrupting its performance:

PTFE provides a matrix through which molecules can be pumped (hydraulically or electrokinetically) without excessive retention or surface adsorption that would occur if the usual hydrocarbon-based hydrophobic phases were used (e.g., packed silica microspheres coated with C18)

PTFE may allow vapor formation with both aqueous and certain non-aqueous solvents such as acetonitrile that wet perfluorocarbons poorly but would wet hydrocarbon surfaces.

The operation of the EK valve was demonstrated using the experimental arrangement 100 shown schematically in FIG. 4. Device 40 consisted of a 250 $\mu$m ID silica capillary 41 with a terminal frit 42. Frit 42 is formed by tamping at least a 1 mm thick (long) layer of diol-coated 5 $\mu$m silica beads into the end of capillary 41, and then repeatedly dipping this end into a tetramethyl orthosilane sol-gel solution and letting it dry. The frit retains in the capillary lumen a layer 1 mm or greater thickness (length) of PTFE beads 43 (nominally 4 $\mu$m diameter DuPont Zonyl® MP 1200 PTFE powder). In the present example PTFE layer 43 was 14 mm long and was formed by slurry-packing in methanol. On top of PTFE layer 43 is a second frit layer 44 of diol-coated silica beads, about 5–10 mm thick (long), in which the frit was thermally formed.

For preliminary demonstration, the open end of the capillary column was connected to a 1 mL syringe 45 containing 10 mM tris buffer at a pH of 8.3 and the column filled with fluid contained in the syringe by injecting it under pressure. The distal end of the column was placed into a buffer reservoir (not shown) into which was inserted ground electrode 46. High voltage platinum electrode 51 was inserted into the barrel of syringe 45, so that pressure could be applied or released using the syringe while current was flowing through the device. Current was monitored via picoammeter 48 by measuring voltage across a 10 k$\Omega$ resistor (not shown) interposed between the cathode and Bertan HV power supply 49 set at 1 kV. Pressure was manually induced with syringe 45 and monitored via pressure transducer 50. Both current and applied pressure were monitored simultaneously via a computer running LabView® software.

Figure 5:
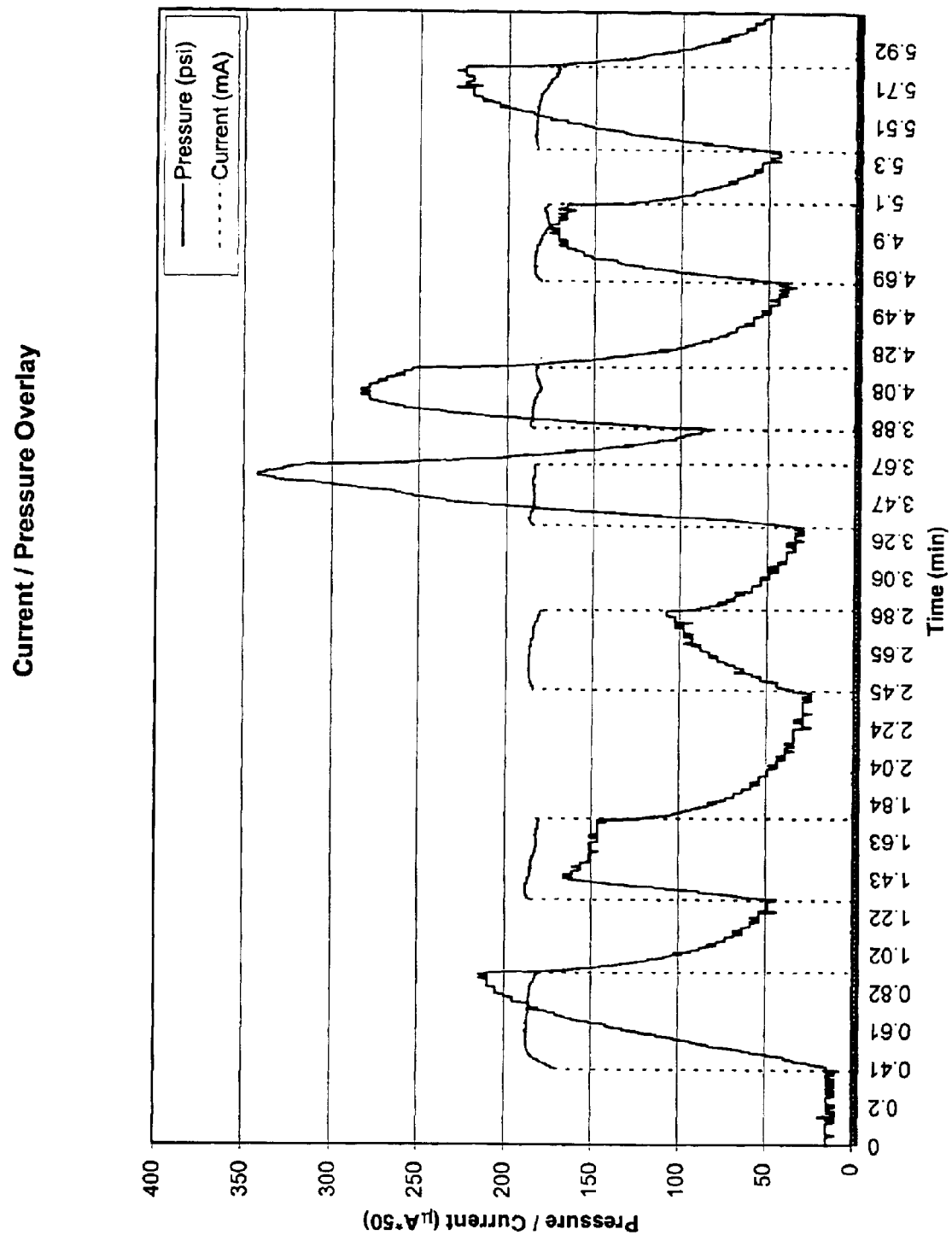
FIG. 5 illustrates the experiment test results from the experiment test stand.

FIG. 5 illustrates the response of device 40 to several cycles of pressure excursion. The observed results show a nearly immediate response in current conductivity as pressure is applied. In every case, irrespective of the maximum pressure applied, current conductivity is seen to increase to within about ±10% of a nominal maximum value. Furthermore, as soon the applied pressure is reversed, i.e., as soon as the syringe plunger is released or withdrawn, the measured current immediately drops to zero and the PTFE region grows visibly white (dry). Finally, the valve appears to change state (on or off, as evidenced by current response) and operate as a "switch" with differential pressure changes on the order of about 10 psi (70 kPa) as compared with the applied ambient pressure.

Alternative Embodiments

Those skilled in the art will appreciate that the EK valve described herein is readily adapted to many additional configurations. In particular it will be appreciated that while the embodiment described above can be operated as a binary, or digital, switch it can and does operate as an analog device as well. The EK valve of the present invention can be operated as a to throttle to fluid conductance by controlling the fraction of wetted pores by adjusting the pressure or temperature of the valve. Active control by conductance sensing may be employed to minimize sensitivity to fabrication, ambient conditions, drift, etc.

Furthermore, the valve can be used as a pressure-to-conductance transducer by connecting the valve pressurization port to the system to be sensed.

Figure 6A:
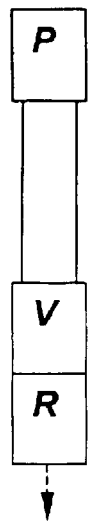
FIGS. 6A and 6B respectively illustrate different arrangements of the valve elements in a single microfluidic channel, and in a microfluidic network of multiple channels.
Figure 6B:
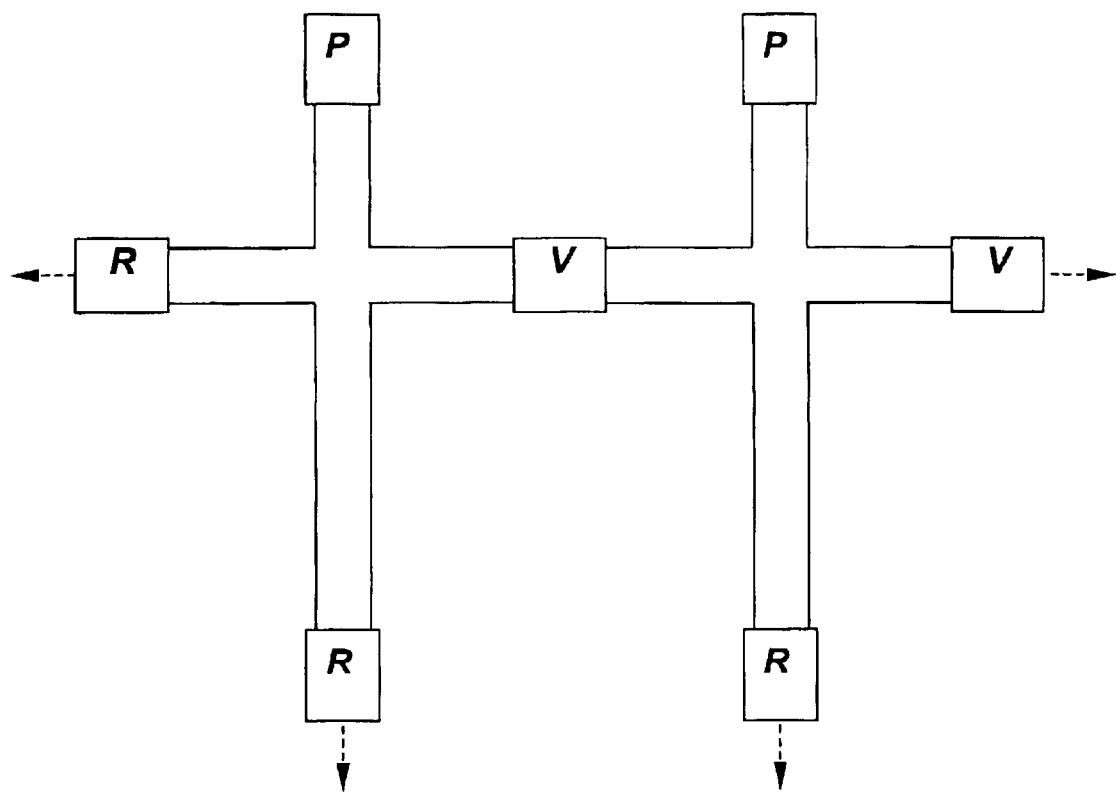

In addition, the various parts of the EK valve described herein can be rearranged so that each is widely separated from the others or from some combination of each. For instance, instead of the present arrangement of pump-valve-restrictor-channel (i.e., p-v-r-c) illustrated in FIG. 3, the pump (p), valve(v), and restrictor(r) portions can be arranged along any of the fluid channels(c), as pump-channel-valve-restrictor, as is shown schematically in FIG. 6A, or as pump-channel-valve-restrictor-channel, and as pump-restrictor-channel-valve-channel-restrictor (not shown). Moreover, by arranging these elements across a manifold, such as is shown in FIG. 6B, it is possible to provide greater flexibility and control of distribution/pathways of charged species propagating through the manifold. (In both FIGS. 6A and 6B the dashed arrows indicate an extension of the channel/network.)

Figure 7A:
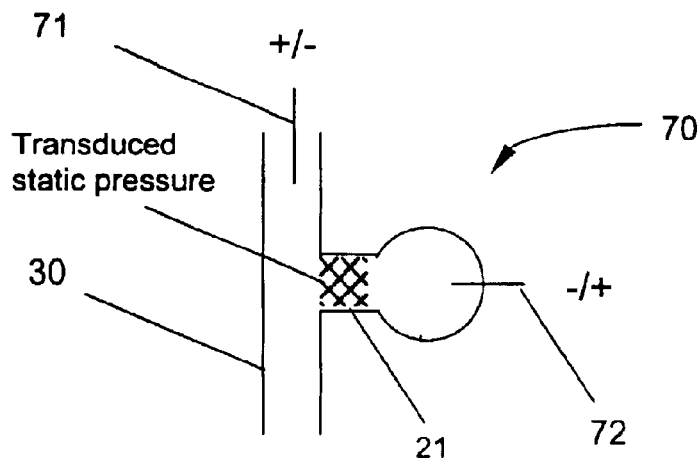
FIGS. 7A, 7B and 7C respectively illustrate different arrangements of the valve elements used for pressure sensing.

Finally, the valve may be deployed as a means for sensing pressure rather than a means for controlling ionic conductance through the manifold. A simple embodiment is shown in FIG. 7A wherein a branch, or gate 70, is placed in one of the flow channels 30 of a network manifold such that it is open to the channel and either closed at an opposite end or open to a second channel (FIG. 7C). The gate contains a length of the porous matrix or a set of the tailored obstructions 21 described earlier. Also included are an arrangement of electrodes, for example, 71 and 72, on either side of the porous matrix that establish an electrical current flow through the porous matrix. The device operates as follows: the pressure in the porous matrix equilibrates with pressure in the manifold. The conductance of the porous matrix depends on the pressure and thermodynamic state of the liquid as previously described. This pressure or state can thus be sensed by measuring the ionic conductance of the porous matrix. The conductance of the porous matrix can be measured by measuring the current flow through the porous matrix as, for example, a change in potential across a standard resistor. Since the electrode 71 is in direct electrical communication with the manifold, it can be common to several pressure transducers channels connected to the manifold.

A preferred embodiment of this conductance measurement is to capacitively couple a time-varying electric waveform to the electrode 72, capacitively or directly ground electrode 71, and measure the magnitude of the time-varying current through either electrode 71 or 72 by standard, well-known means, for example, envelope or phase-sensitive detection. The time-varying field can be made uniquely attributable to the sensor electrode 72 by for example applying a sensor-unique sinusoidal frequency or a sensor-unique spread-spectrum code sequence, allowing different sensors to be multiplexed to a common electrode 71. Capacitive coupling blocks any direct current, helping to prevent bubble generation at the electrodes, and allows the current and consequently pressure measurement to be made independently from other applied potentials, including, for example, fields applied to drive electrokinesis.

Figure 7B:
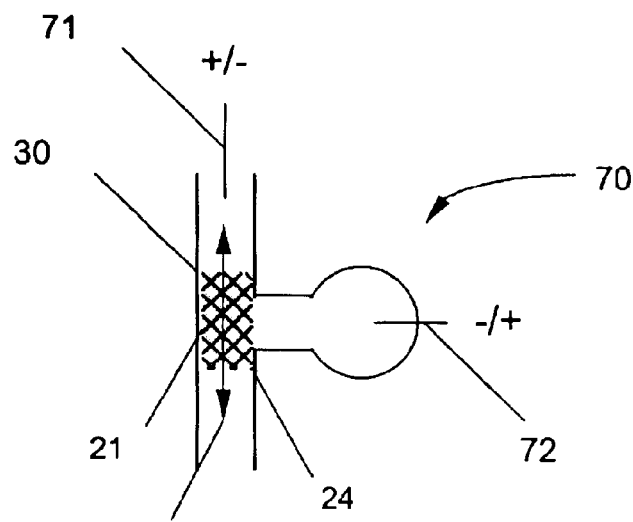
Figure 7C:
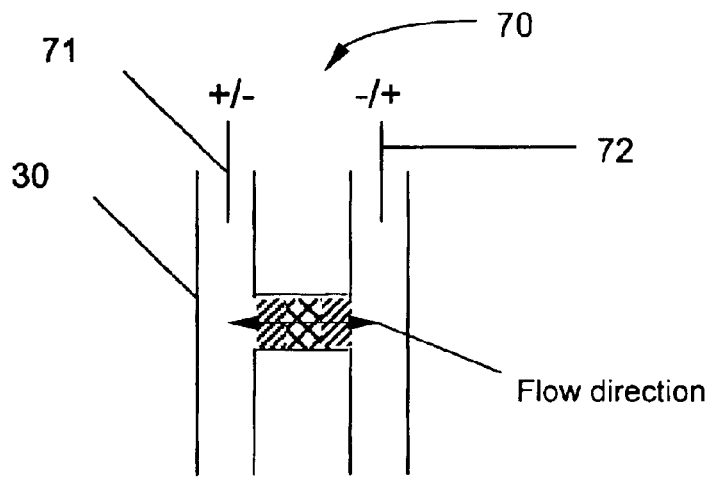

Alternatively, as shown in FIG. 7B, the same general components may be arranged as a passive flow-rate sensitive device by eliminating the porous matrix in the branching channel 70, such that it now only contains electrode 72 and the solvent fluid, and by placing the channel branch adjacent to the porous matrix 21 of the valve of the present invention. The device can then operate to sense the pressure in the manifold channel by measuring the electrical current developed by the flow of ionic species through the porous matrix of the valve. The device is also sensitive to flow rate, through accompanying pressure drop in the porous plug. FIG. 7C shows a similar device having enhanced sensitivity to flow rate by the addition of flow-restrictor elements.

While the particular EK valve, as shown and described herein, is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A conductance valve for regulating transport of charged species, comprising:
   a fluid channel comprising a fluid media, said fluid media comprising one or more charged species;
   a porous hydrophobic matrix comprising a plurality of interstitial void spaces, said porous matrix filling a length of said fluid channel, wherein said fluid media fills said at least some of said interstitial void spaces;
   a fluid reservoir adjacent to and in fluid communication with said porous matrix, said fluid reservoir comprising a quantity of said fluid media;
   flow restriction means located at first and second ends of said porous matrix; and
   means for controllably applying a differential hydraulic pressure to said fluid media in said fluid reservoir and said porous matrix.

2. The conductance valve of claim 1, wherein said means for controllably generating a differential hydraulic pressure operates in response to a control stimulus.

3. The conductance valve of claim 2, wherein said control stimulus is an electrical potential.

4. The conductance valve of claim 1, wherein said means for controllably generating a differential hydraulic pressure is an actuator.

5. The conductance valve of claim 4, wherein said actuator operates to reversibly fill and empty at least some of said interstitial void spaces with said fluid media.

6. The conductance valve of claim 5, wherein said actuator operates as a transducer.

7. The conductance valve of claim 4, wherein said actuator is an electrokinetic pump.

8. The conductance valve of claim 4, wherein said actuator is a thermal heater.

9. The conductance valve of claim 1, wherein said porous hydrophobic matrix comprises a plurality of flow obstructing structures.

10. The conductance valve of claim 1, wherein said plurality of flow obstructing structures are selected from the group of structures consisting of, a plurality of packed beads, an array of microfabricated posts, one or more microfabricated shelves, and combinations thereof.

11. The conductance valve of claim 9, wherein said flow obstructing structures comprise a material selected from the group consisting of polytetrafluoroethylene, polytrifluorochloroethylene, and acetal resin.

12. The conductance valve of claim 11, wherein said flow obstructing structures comprise a comminuted form of polytetrafluoroethylene comprise spheroid beads.

13. The conductance valve of claim 10, wherein said plurality of flow obstructing structures comprise a distribution of sizes and shapes, said plurality of structures packed together in a predetermined order to provide a porous matrix having a controlled and predetermined distribution of interstitial pore sizes.

14. The conductance valve of claim 1, wherein said flow restriction means comprises a quantity of packed beads.

15. The conductance valve of claim 14, wherein said packed beads comprise spheroid beads.

16. The conductance valve of claim 15, wherein said packed beads are selected from the group of materials consisting of pure silica, glass, quartz, alumina, and rutile.

17. A pressure sensing apparatus, comprising:
a fluid channel comprising a fluid media, said fluid media comprising one or more charged species;
a porous hydrophobic matrix comprising a plurality of interstitial void spaces, wherein said fluid media fills said at least some of said interstitial void spaces;
a fluid reservoir adjacent to and in fluid communication with said porous hydrophobic matrix, said fluid reservoir comprising a quantity of said fluid media; and
at least first and second electrodes in electrical communication with said one or more charged species, wherein said porous matrix is disposed between said at least first and second, and where said first electrodes is disposed in said fluid reservoir.

18. The pressure sensing apparatus of claim 17, wherein said porous hydrophobic matrix comprises a plurality of flow obstructing structures.

19. The pressure sensing apparatus of claim 18, wherein said plurality of flow obstructing structures are selected from the group of structures consisting of, a plurality of packed beads, an array of microfabricated posts, one or more microfabricated shelves, and combinations thereof.

20. The pressure sensing apparatus of claim 18, wherein said flow obstructing structures comprise a material selected from the group consisting of polytetrafluoroethylene, polytrifluorochloroethylene, and acetal resin.

21. The pressure sensing apparatus of claim 20, wherein said flow obstructing structures comprise a comminuted form of polytetrafluoroethylene comprise spheroid beads.

22. The pressure sensing apparatus of claim 19, wherein said plurality of flow obstructing structures comprise a distribution of sizes and shapes, said flow obstructing structures packed together in a predetermined order to provide a porous matrix having a controlled and predetermined distribution of interstitial pore sizes.

23. A method for regulating transport of charged species in a channel network, comprising the step of:
providing a channel network comprising one or more flow channels, wherein said flow channels comprise a fluid media and one or more charged species;
providing a porous hydrophobic matrix filling a region in one of said flow channels, wherein said porous hydrophobic matrix comprise an interstitial void volume, said fluid media filling some fraction of said interstitial void volume;
providing a fluid reservoir comprising a quantity of said fluid media, wherein said quantity of fluid media is in fluid communication with said porous hydrophobic matrix; and
changing an hydraulic pressure in said region comprising said porous hydrophobic matrix with respect to an ambient hydraulic pressure elsewhere in said channel network, said change in hydraulic pressure in said porous hydrophobic matrix changing the fraction of interstitial void space volume filled by said fluid media thereby changing the conductance of said charges species through said porous hydrophobic matrix.

24. The method of claim 23, wherein said step of providing a porous hydrophobic matrix further comprises providing a plurality of flow obstructing structures.

25. The method of claim 24, wherein said plurality of flow obstructing structures are selected from the group of structures consisting of, a plurality of packed beads, an array of microfabricated posts, one or more microfabricated shelves, and combinations thereof.

26. The method of claim of claim 24, wherein said flow obstructing structures comprise a material selected from the group consisting of polytetrafluoroethylene, polytrifluorochloroethylene, and acetal resin.

27. The method of claim of claim 25, wherein said flow obstructing structures comprise a comminuted form of polytetrafluoroethylene comprise spheroid beads.

28. The method of claim of claim 24, wherein said plurality of flow obstructing structures comprise a distribution of sizes and shapes, said flow obstructing structures packed together in a predetermined order to provide a porous matrix having a controlled and predetermined distribution of interstitial pore sizes.

29. The method of claim of claim 23, wherein said means for changing an hydraulic pressure operates in response to a control stimulus.

30. The method of claim of claim 29, wherein said control stimulus is an electrical potential.

31. The method of claim of claim 23, wherein said means for changing an hydraulic pressure is an actuator.

32. The method of claim of claim 31, wherein said actuator operates to reversibly fill and empty at least some of said interstitial void spaces with said fluid media.

33. The method of claim of claim 32, wherein said actuator operates as a transducer.

34. The method of claim of claim 31, wherein said actuator is an electrokinetic pump.

35. The method of claim of claim 31, wherein said actuator is a thermal heater.

36. An electrokinetic switch for gating transport of charged species, comprising:
a fluid channel comprising a fluid media, said fluid media comprising one or more charged species;
a porous hydrophobic matrix comprising a plurality of interstitial void spaces, said porous matrix filling a length of said fluid channel, wherein said fluid media fills said at least some of said interstitial void spaces;
a fluid reservoir adjacent to and in fluid communication with said porous matrix, said fluid reservoir comprising a quantity of said fluid media;
flow restriction means located at first and second ends of said porous matrix; and
actuator means operating on said fluid media in said fluid reservoir to move said fluid media into or out from said interstitial void spaces, wherein said electrokinetic switch acts to allow conductance of said charged species through said hydrophobic matrix when said fluid media fills said interstitial void spaces, and wherein said electrokinetic switch acts to block conductance of said charged species through said hydrophobic matrix when said interstitial void space are void or nearly void of said fluid media.

* * * * *